Figure 1:
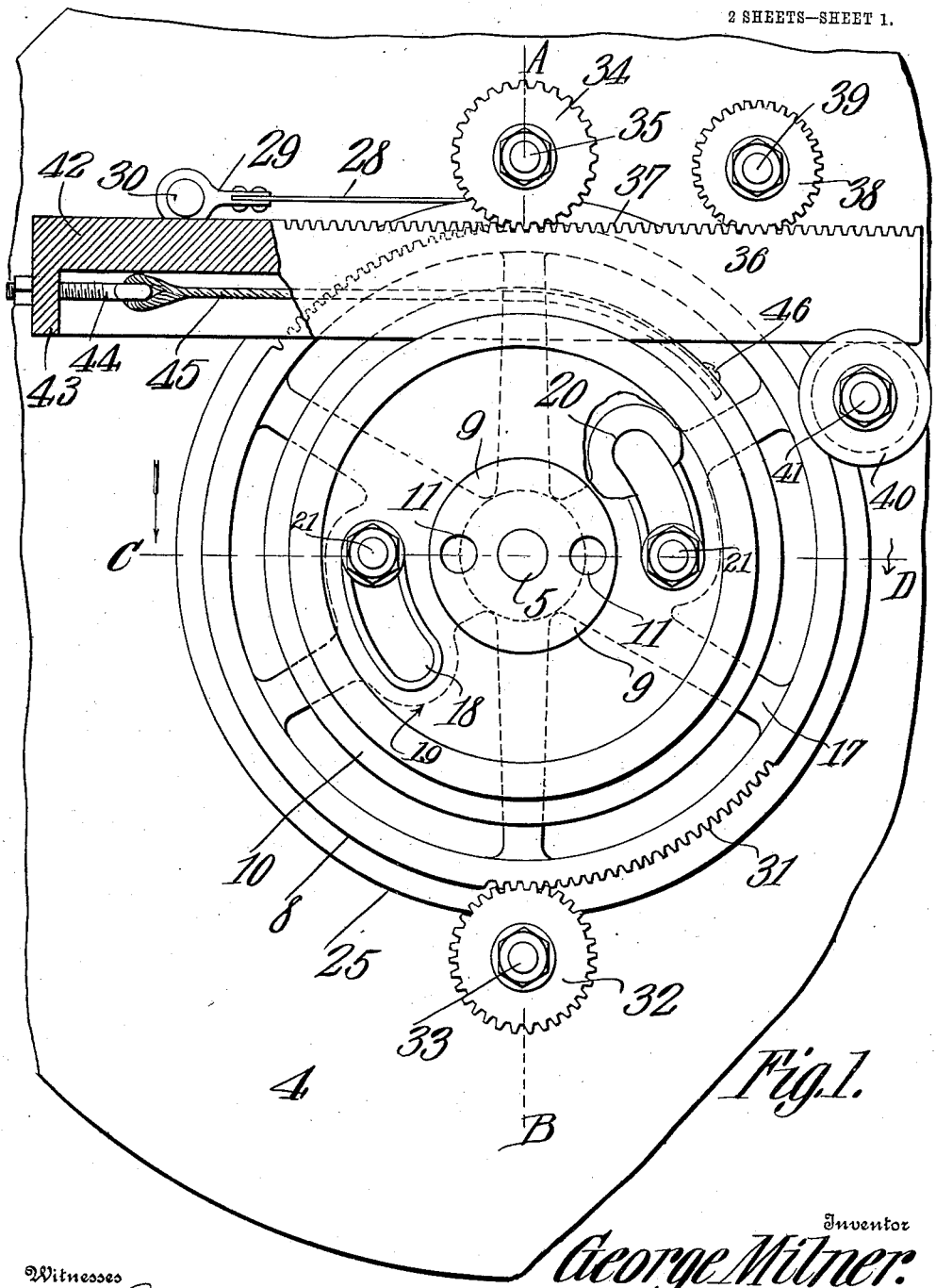

G. MILNER.
POWER TRANSMISSION GEARING.
APPLICATION FILED APR. 11, 1908.

910,215.

Patented Jan. 19, 1909.

2 SHEETS—SHEET 1.

Witnesses

Inventor
George Milner
By C. A. Snow & Co.
Attorneys

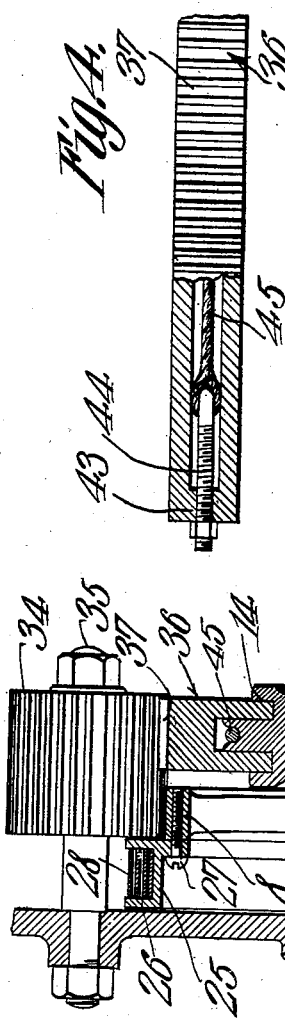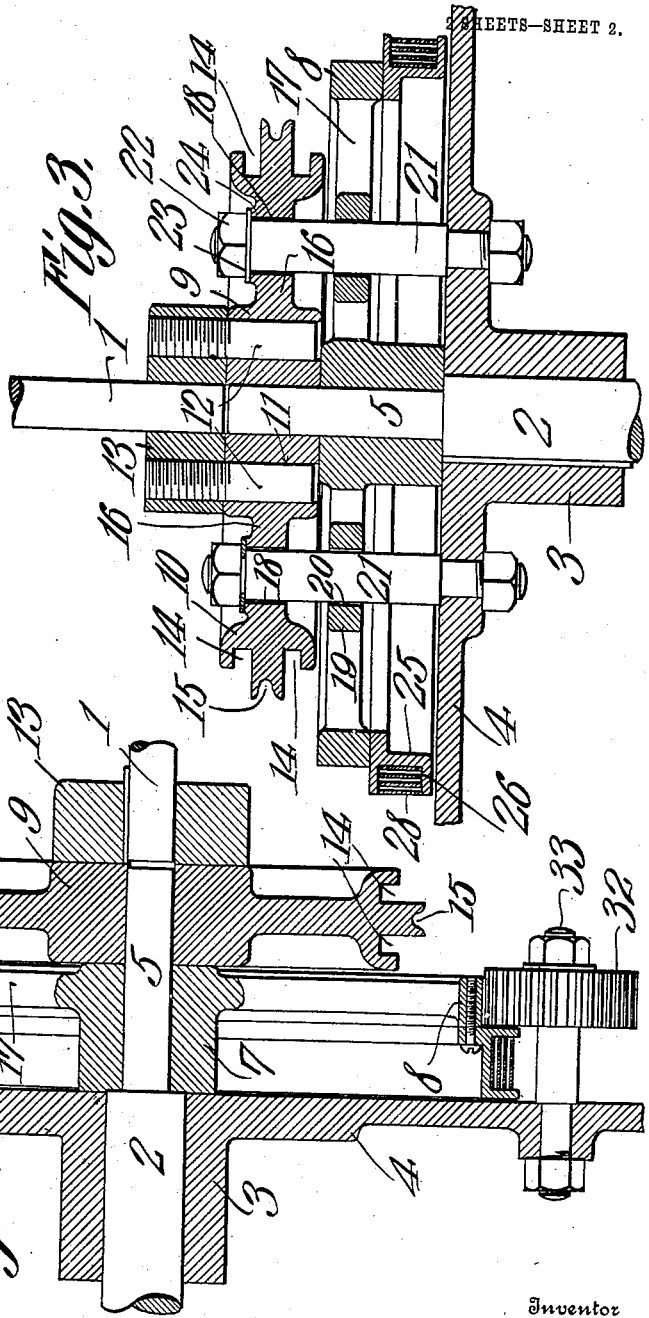

UNITED STATES PATENT OFFICE.

GEORGE MILNER, OF BROOKLYN, NEW YORK, ASSIGNOR TO THE MILNER POWER MULTIPLYING MACHINE CO., INCORPORATED, OF BROOKLYN, NEW YORK.

POWER-TRANSMISSION GEARING.

No. 910,215.     Specification of Letters Patent.     Patented Jan. 19, 1909.

Application filed April 11, 1908. Serial No. 426,503.

*To all whom it may concern:*

Be it known that I, GEORGE MILNER, a citizen of the United States, residing at Brooklyn, in the county of Kings and State of New York, have invented a new and useful Power-Transmission Gearing, of which the following is a specification.

This invention has reference to improvements in power transmission gearing, and its object is to obtain an increase of power from a driving member to a driven member, and this is more especially true where it is desired to produce an increased starting torque.

The invention consists essentially in a driving member and a driven member and intermediate members connecting the driving member to the driven member, which intermediate members comprise a rotatable gear coupled by flexible connections to a rack which in turn engages a pinion and the latter is in mesh with another gear of larger diameter than the member connected to the flexible connection, and this last-named gear is connected through the intermediary of a spiral spring to a disk near the periphery of the latter, which disk is fixed to the driven member. The drive member may be a shaft connected directly or indirectly to an engine or other prime mover, and the driven member may also be a shaft connected either directly or indirectly to the work.

The invention will be best understood from the following detail description taken in connection with the accompanying drawings forming a part of this specification, in which drawings,—

Figure 1 is an elevation of the improved power transmission gear with the drive shaft omitted. Fig. 2 is a diametrical section on the line A—B of Fig. 1, showing the drive shaft in position. Fig. 3 is a diametrical section of Fig. 1 on the line C—D, also showing the drive-shaft in position. Fig. 4 is a detail view of a porton of the rack-bar and flexible connections coupled thereto.

Referring to the drawings, there is shown a drive-shaft 1, which may be considered either as the drive-shaft of an engine or the armature shaft of an electric motor or even a countershaft receiving power from some prime mover. In line with the drive shaft is the driven shaft 2, which may be directly connected to the work or may be indirectly connected thereto, as may be found most desirable. Only the contiguous ends of the drive and driven shafts are shown. It will be understood, however, that these shafts are, in practice, provided with suitable bearings, as may be needed. The shaft 2 is made fast to the hub 3 of a disk 4, the purpose of which will hereinafter appear. The shaft 2 extends beyond the face of the disk 4 and is there reduced in diameter, as shown at 5, and upon this reduced portion 5 of the shaft 2 adjacent to the disk 4 is the hub 7 of a gear wheel 8. Beyond the gear wheel 8 the shaft extension 5 carries the hub 9 of a sheave 10. The hub 9 is provided with two diametrically opposite perforations 11 entered by studs 12 correspondingly located on a hub 13 keyed fast to the shaft 1. The shaft 1 may be otherwise connected to the hub 9 of the sheave 10, but the connection described forms a convenient means of connection and permits the shaft 1 to be moved longitudinally away from the shaft 2 and so disconnect the parts when desired.

The sheave 10 is provided with a peripheral circumferential groove 15 flanked on either side by circumferential grooves 14, the purpose of which will hereinafter appear. The hub and rim of the sheave 10 are shown as connected by a web 16, but of course spokes may be used instead of the web. It is preferred, however, to use the web. The rim and hub of the gear wheels 8 are connected by spokes 17. Here, again, it is apparent that a web may be used in place of the spokes. However, it is preferred in this case to use spokes.

Extending through the web 16 of the sheave 10 at diametrically opposite points therein are arc-shaped slots 18 curved on an arc struck from the axis of the sheave as a center. The corresponding points on opposite spokes of the gear wheel 8 are expanded, as shown at 19, and these expanded portions have through slots 20 matching the slots 18 in the web 16.

At diametrically opposite points on the disk 4 are secured stud bolts 21 projecting from the face of the disk and located to pass through the slots 20 of the extensions 19 of the spokes of the gear wheel 8 and also through the slots 18 of the web of the sheave 10. The outer ends of the studs 21 are reduced in diameter and threaded, and to these threaded ends are applied the nuts 22 and washers 23, the washers being confined by the nuts against ledges 24 surrounding the slots 18 in the sheave 10. The studs 21 serve to hold the gear wheel 8 and the sheave 10 on the extension 5 of the shaft 2 and in proper relation to the disk 4, but at the same time both the sheave and the gear wheel are capable of a partial rotation about the extension 5 as an axis, to the end of the slots 18 and 20.

Fast to the rim of the gear wheel 8 between the same and the face of the disk 4 is an annulus 25 formed with a circumferential channel 26. The annulus 25 is made fast to the gear wheel by screws 27, or in any other suitable manner. The diameter of the annulus 25 is somewhat greater than that of the gear wheel, and the channel 26 receives the coils of a spiral leaf spring 28, the inner end of which is fast to the annulus and the outer end of which is made fast to an eye 29 pivoted upon a pin 30 projecting from the face of the disk 4 near the periphery thereof.

Since the gear wheel 8 makes but a partial rotation upon its axis, it is unnecessary to complete the gear teeth all around the periphery, and consequently this wheel is provided at diametrically opposite points with gear tooth segments 31. One of these segments 31 is in mesh with a pinion 32 mounted upon a stud 33 projecting from the face of the disk 4. The other gear segment 31 is in mesh with another pinion 34 mounted upon a stud 35 projecting from the face of the disk 4 at a point diametrically opposite from the pin 33 and gear wheel 32.

Mounted in the grooves 14 of the sheave 10 is a rectangular frame 36 having the edge remote from the grooves 14 provided with a rack 37 in mesh with the pinion 34 which is made wide enough for the purpose so as to engage both rack 37 and the segment 31 of the gear wheel 8. The rack frame 36 is confined to the grooves 14 by the pinion 34 and is constrained to travel in a straight line by another pinion 38 meshing with the rack 37 and mounted upon a stud 39 projecting from the face of the disk 4 and by a grooved pulley 40 mounted on a stud 41 projecting from the face of the disk 4 and engaging the frame 36 at a point opposite, or nearly opposite, the pinion 38. The end of the frame 36 remote from the pulley 40 and the pinion 38 is formed with an extension 42 terminating in a cross head 43, which latter has fast thereto an adjustable eye bolt 44 receiving the ends of a rope or cable 45 entering the groove 15 of the sheave 10 and fast to the latter at an appropriate point by a screw 46 or otherwise.

Let it be assumed that the shaft 2 connected to the work is standing still and that power is applied to the shaft 1 in a manner to rotate the same clockwise as the structure is viewed in Fig. 1. The sheave 10 immediately participates in the movement of the shaft 1 since it is positively connected thereto. The first movement of the sheave 10 will wind up the rope or strand 45 into the groove 15, and the rack-frame 36 is thereby moved toward the right, as viewed in Fig. 1. This movement of the frame 36 causes the rack 37 to engage the pinion 34 and rotate the same in a direction to impart to the gear wheel 8 a rotative movement in the same direction as the sheave 10. The result of this is that the spring 28 is wound up on the spring drum or annulus 25, and this movement continues until finally the resistance of the work is overcome and rotative movement is imparted to the shaft 2 by the disk 4. There is, of course, a considerable length of time after the beginning of the rotation of the shaft 1 before the spring is under sufficient tension to overcome the dead resistance of the load and impart rotative movement to the shaft 2. There is, therefore, a very appreciable time element between the starting of the power shaft and the starting of the driven shaft and consequently there is developed a powerful starting torque. Should there be variations in the load these are readily taken care of by the reaction of the spring 28.

As the structure is shown in the drawings the disk 4 is somewhat unbalanced by having but one rack segment 36. In order to balance the disk the pinion 32 may be replaced by a wide pinion 34 and another rack segment 36 connected to the sheave 10 may be provided on the opposite side of the disk from that occupied by the rack frame 36 as shown in Fig. 1. This is, of course, an apparent addition to the structure of Fig. 1 and need not be illustrated.

What is claimed is:—

1. In a mechanism of the class described, a drive shaft, a driven shaft, a disk carried by said driven shaft and rotatable therewith, a sheave carried by the driven shaft and rotatable independently thereof, the said sheave being connected to the drive shaft, a gear wheel carried by the driven shaft and rotatable independently thereof, a spring connected to the gear wheel and to the disk, a rack-bar mounted for rectilinear movement therealong on said sheave, and a pinion carried by the disk in mesh with both the rack bar and gear wheel.

2. In a mechanism of the class described, a drive shaft, a driven shaft, a disk carried by said driven shaft and rotatable therewith, a sheave carried by the driven shaft and rotatable independently thereof, said sheave having a circumferential groove formed in its periphery and flanking grooves also formed in its periphery, a rack-bar mounted for rectilinear movement and seated in the flanking grooves in the sheave, a flexible strand connected with the sheave and seated in the intermediate groove on the periphery thereof and also connected to the rack-bar, a gear wheel mounted on the driven shaft and rotatable independently thereof, a spring between the gear wheel and the disk, and a pinion in mesh with the rack-bar and with the gear wheel.

3. In a mechanism of the class described, a drive shaft, a driven shaft, a disk carried by said driven shaft and rotatable therewith, a sheave carried by the driven shaft and rotatable independently thereof, said sheave being connected to the drive shaft, a rack-bar mounted for rectilinear movement and connected to said sheave, a gear wheel mounted on the driven shaft and rotatable independently thereof, an annular spring drum carried by the gear wheel, a spiral leaf spring carried by the drum and connected at one end to the disk, and a pinion mounted on the disk and in mesh with the rack-bar and the gear wheel.

4. In a mechanism of the class described, a drive shaft, a driven shaft, a disk carried by said driven shaft and rotatable therewith, a sheave carried by the driven shaft and rotatable independently thereof, said sheave being connected to the drive shaft and provided with a circumferential groove and having other grooves flanking the first-named groove, a rack-bar mounted in the flanking grooves on the sheave and constrained to rectilinear movement, said rack-bar being also connected to said sheave, a gear wheel mounted on the driven shaft and rotatable independently thereof, an annular spring drum fast on the gear wheel, a spiral leaf spring on the drum and having one end fast to the disk, and a pinion mounted on the disk and in mesh with the rack bar and gear wheel.

In testimony that I claim the foregoing as my own, I have hereto affixed my signature in the presence of two witnesses.

GEORGE MILNER. [L. S.]

Witnesses:
    CHAS. GRANGER,
    FREDERICK M. CULLY.